United States Patent
Gu et al.

(10) Patent No.: US 8,388,806 B2
(45) Date of Patent: Mar. 5, 2013

(54) HYDROPHOBICALLY MODIFED POLY[ETHYLENE GLYCOL] FOR USE IN PITCH AND STICKIES CONTROL IN PULP AND PAPERMAKING PROCESSES

(75) Inventors: Qu-Ming Gu, Bear, DE (US); Huai N. Cheng, Avondale, PA (US); William S. Carey, Wallingford, PA (US); Robert A. Gelman, Newark, DE (US); Jennifer L. Rittenhouse-Pruss, Atglen, PA (US); Erin A. S. Doherty, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 792 days.

(21) Appl. No.: 11/881,128

(22) Filed: Jul. 25, 2007

(65) Prior Publication Data
US 2008/0029231 A1 Feb. 7, 2008

Related U.S. Application Data

(60) Provisional application No. 60/833,288, filed on Jul. 26, 2006.

(51) Int. Cl.
*D21H 21/02* (2006.01)

(52) U.S. Cl. ............... 162/158; 162/72; 162/199

(58) Field of Classification Search ............ 162/199, 162/72, 158
See application file for complete search history.

(56) References Cited

U.S. PATENT DOCUMENTS

| | | | | |
|---|---|---|---|---|
| 4,086,279 | A | 4/1978 | Langdon et al. | 260/615 B |
| 4,184,912 | A | 1/1980 | Payton | 162/72 |
| 4,861,429 | A | 8/1989 | Barnett et al. | 162/199 |
| 4,871,424 | A | 10/1989 | Dreisbach et al. | 162/168.3 |
| 4,886,575 | A | 12/1989 | Moreland | 162/5 |
| 5,228,908 | A * | 7/1993 | Burdick et al. | 106/162.8 |
| 6,482,994 | B2 | 11/2002 | Scheper et al. | 568/625 |
| 2005/0150418 | A1 | 7/2005 | Bakeev | 106/14.5 |

FOREIGN PATENT DOCUMENTS

| | | |
|---|---|---|
| EP | 0 155 116 | 9/1985 |
| EP | 0 568 229 | 4/1993 |
| WO | WO 01/09434 | 2/2001 |
| WO | WO 2007/037466 | 4/2007 |

OTHER PUBLICATIONS

Polyethylene Glycols data sheet, JECFA, published FNP 38 1988, downloaded online Apr. 6, 2012.*
Chemical Abstracts 82:18896.

* cited by examiner

*Primary Examiner* — Anthony Calandra
(74) *Attorney, Agent, or Firm* — Joanne Mary Fobare Rossi; Shaorong Chen; Michael J. Herman

(57) ABSTRACT

Methods for inhibiting the depositions of organic contaminants from pulp in pulp and papermaking systems are disclosed. Hydrophobically modified poly[ethylene glycol] are added to the pulp or applied to deposition-prone surfaces of a papermaking system.

20 Claims, No Drawings

HYDROPHOBICALLY MODIFED POLY[ETHYLENE GLYCOL] FOR USE IN PITCH AND STICKIES CONTROL IN PULP AND PAPERMAKING PROCESSES This application is the regular filing of provisional application 60/833,288, filed Jul. 26, 2006, the contents of which are incorporated by reference.

FIELD OF THE INVENTION

The present invention relates to methods for inhibiting the deposition of organic contaminants in pulp and papermaking systems.

BACKGROUND OF THE INVENTION

The deposition of organic contaminants (i.e., pitch and stickies) on surfaces in the papermaking process is well known to be detrimental to both product quality and the efficiency of the papermaking process. Some contaminating components occur naturally in wood and are released during various pulping and papermaking processes. Two specific manifestations of this problem are referred to as pitch (primarily natural resins) and stickies (adhesives or coatings from recycled paper). Pitch and stickies have the potential to cause problems with deposition, quality, and efficiency in the process as mentioned above.

The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

Stickies is a term that has been increasingly used to describe deposits that occur in the systems using recycled fiber. These deposits often contain the same materials found in "pitch" deposits as well as adhesives, hot melts, waxes, and inks.

The deposition of organic contaminants, such as pitch and stickies, can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. This deposition can occur not only on metal surfaces in the system, but also on plastic and synthetic surfaces such as machine wires, felts, foils, Uhle boxes and head box components.

Historically, the subsets of the organic deposit problems, "pitch" and "stickies", have manifested themselves separately, differently and have been treated distinctly and separately. From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickies" have usually been particles of visible or nearly visible size in the stock which originate from the recycled fiber. These deposits tend to accumulate on many of the same surfaces that "pitch" can be found on and causes many of the same difficulties that "pitch" can cause. The most severe "stickies" related deposits however tend to be found on paper machine wires, wet felts, dryer felts and dryer cans.

Methods of preventing the build-up of deposits on the pulp and paper mill equipment and surfaces are of great importance to the industry. The paper machines could be shut down for cleaning, but ceasing operation for cleaning is undesirable because of the consequential loss of productivity, poor quality while partially contaminated and "dirt" which occurs when deposits break off and become incorporated in the sheet. Preventing deposition is thus greatly preferred where it can be effectively practiced.

Poly[vinyl alcohol-co-vinyl acetate] is shown to be effective in controlling the deposition of pitch and stickies contaminants from pulp and papermaking systems in U.S. Pat. Nos. 4,871,424 and 4,886,575, respectively.

U.S. Pat. Nos. 4,184,912 and 4,861,429 teach methods of inhibiting organic contaminant deposition in pulp and papermaking systems by the addition of multi-component compositions comprising in part a non-ionic surfactant.

European Patent Application 0 568 229 A1 claims a method for inhibiting the deposition of organic contaminants from pulp and paper making system comprising treatment with a hydrophobically modified polymer including polyethylene oxide polymers functionalized with hydrophobic groups connected via an ester linkage.

Chemical Abstract Number 82:18,896 refers to a method for removing pitch from pulp comprising treatment with polyethylene glycol alkyl ether surfactant derived by reacting a secondary alcohol with alkyl glycidyl ether.

U.S. Pat. No. 6,482,994 B2 teaches that ethoxylated alcohols surfactants which are ether-capped by reaction with glycidyl ether provide superior grease cleaning abilities and improved spotting/filming benefits in dishwashing applications.

U.S. Pat. Application 2005/0150418 A1 claims a polymer composition comprising water-soluble or water-swellable synthetic polymer backbone that has covalently connected ends and/or intermediate blocks of oligomeric hydrophobes wherein the blocks are composed of two or more units of hydrophobes. These hydrophobically associative polymers are taught to enhance the thickening, leveling, and sag properties of waterborne coatings. The examples of the polymer composition included the reaction products of polyethylene glycols and aryl glycidyl ethers and alkyl epoxides. The 5 weight % aqueous solution viscosities of these materials in the examples ranged from 19,000 cps to >400,000 cps. Included in the list of typical applications where these polymer compositions may find utility included pitch control in pulping.

A drawback to the prior art is that the poly[vinyl alcohol-co-vinyl acetate] is susceptible to further hydrolysis under pulp and papermaking environments which reduces its efficacy. The polyethylene glycol based non-ionic surfactants cited are also typically utilized in multi-component formulations and also contain functionalities susceptible to hydrolysis. In addition, the solution viscosities of the hydrophobically modified polyethylene glycol associative polymers are too high to make their use practical from a commercial perspective.

SUMMARY OF THE INVENTION

The present invention provides for compositions and methods for inhibiting the depositions of organic contaminants from pulp and papermaking systems. The methods comprise adding to the pulp or applying to the surfaces of papermaking machinery an effective deposition inhibiting amount of a hydrophobically modified poly[ethylene glycol].

DETAILED DESCRIPTION OF THE INVENTION

The present invention discloses compositions and methods for inhibiting the deposition of organic contaminants from pulp or onto the surface of papermaking machinery in pulp and papermaking systems comprising adding to the pulp or applying to the surfaces of the paper making machinery an effective deposition inhibiting amount of a hydrophobically modified poly[ethylene glycol]. The present invention provides for methods for inhibiting the deposition of organic contaminants, such as pitch and stickies, from pulp and papermaking systems.

Organic contaminants include constituents which occur in the pulp (virgin, recycled or combinations thereof) having the potential to deposit and reduce paper machine performance or paper quality. These contaminants include, but are not limited, to natural resins such as fatty acids, resin acids, their insoluble salts, fatty esters, sterols; and other organic constituents such as ethylene bis-stearamide, waxes, sizing agents, adhesives, hot melts, inks, defoamers, and latexes which may deposit in papermaking systems.

In one embodiment of the invention, the hydrophobically modified poly[ethylene glycol] of the present invention comprises the formula:

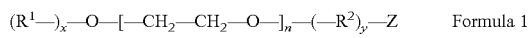

Formula 1 wherein $R^1$ and $R^2$ are independent hydrophobic moieties, or blocks of hydrophobic moieties of x and y repeat units, covalently bonded to poly[ethylene glycol]; n is 2 to 1200; x is 1 to 10; y is 0 to 10; Z is only present when y=0 and is hydrogen; with the proviso that the sum of x and y is greater than or equal to 2. It is understood that the material is not a homogenous material. The hydrophobically modified poly[ethylene glycol] of the present invention is a heterogeneous material where the values of x and y are average values in the composition. The actual values will be a distribution. The composition is not composed entirely of material wherein x and y are greater than or equal to 2.

The hydrophobic moieties $R^1$ and $R^2$ are formed after reaction of a poly[ethylene glycol] with a hydrophobic reagent known to those skilled in the art to be reactive with a primary alcohol. The hydrophobic reagent can be linear or branched, saturated or unsaturated, aliphatic or aromatic hydrocarbon radicals having from 2 to 100 carbon atom, or mixtures thereof. Exemplary compounds encompassed by $R^1$ and $R^2$ include, but are not limited to, alkenyl succinic anhydrides, such as n-octenylsuccinic anhydride; alkyl or alkenyl ketene dimers, such as lauryl ketene dimer; alkyl halides such as 2-ethylhexyl bromide; epoxides such as 1,2-epoxyhexane and 1,2-epoxydodecane; glycidyl ethers such as dodecyl glycidyl ether, 2-ethylhexyl glycidyl ether, butyl glycidyl ether, and 2-methyl phenyl glycidyl ether; carboxylic acids and their related acid chlorides or esters such as oleic acid, oleoyl chloride, and oleic acid methyl ester; mixtures of any of the foregoing and the like.

It is further known to those skilled in the art that reaction of the primary alcohol with some of the exemplary hydrophobic compounds encompassed by $R^1$ and $R^2$ yields a functionality that can further react with another hydrophobic compound. For example, reaction of a primary alcohol with a hydrophobic epoxide yields a reaction product bearing a hydroxyl functionality that can further react with another mole of the hydrophobic epoxide. Use of these types of hydrophobic reagents can result in the formation of blocks of hydrophobe covalently attached to the poly[ethylene glycol].

In a preferred embodiment of the invention the hydrophobically modified poly[ethylene glycol] is represented by the following formula:

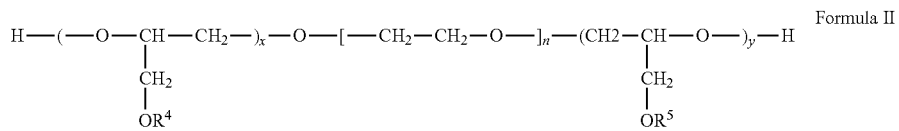

Formula II wherein n is 2 to 1200; $R^4$ and $R^5$ are linear or branched, saturated or unsaturated, aliphatic or aromatic hydrocarbon radicals having from 2 to 100 carbon atoms, or mixtures thereof; x is 1 to 10; y is 0 to 10; with the proviso that the sum of x and y is greater than or equal to 2. It is understood that the material is not a homogenous material. The hydrophobically modified poly[ethylene glycol] of the present invention is a heterogeneous material where the values of x and y are average values in the composition. The actual values will be a distribution. The composition is not composed entirely of material wherein x and y are greater than or equal to 2.

Within this preferred embodiment the hydrophobically modified poly[ethylene glycol] is prepared by reacting polyethylene glycol with an aliphatic glycidyl ether, or mixtures thereof, to yield a composition represented by Formula II wherein preferably n is 10 to 700, $R^4$ and $R^5$ are linear or branched, saturated or unsaturated, aliphatic or aromatic hydrocarbon radicals having from 4 to 20 carbon atoms, or mixtures thereof; x is 1 to 4; y is 0 to 4; with the proviso that the sum of x and y is from 2 to 6. It is understood that the material is not a homogenous material.

The hydrophobically modified poly[ethylene glycol] of the present invention is a heterogeneous material where the values of x and y are average values in the composition. The actual values will be a distribution. The composition is not composed entirely of material wherein x and y are greater than or equal to 2. For example, relative to the particularly preferred embodiment, if 4 mole of glycidyl ether are reacted per mole of poly[ethylene glycol] then a mixture of numerous combinations of x and y in Formula II will result; e.g., 4:0, 3:1, 2:2, 1:3, etc . . . Those skilled in the art will realize that the product produced under these conditions will be composed of a distribution of the possible combinations of x and y. If the hydrophobic reagents are mono-functional with respect to the primary alcohol, then it will be readily apparent to those skilled in the art that only two moles can be reacted per poly[ethylene glycol] and both x and y will equal 1.

The compositions of the present invention can be prepared by reacting poly[ethylene glycol] directly with the desired amount of hydrophobic reagent. Depending on the chemical nature of the hydrophobic reagent and the molecular weight of the polyethylene glycol the reaction rate and/or efficiency may be improved by use of a solvent, an acid or base catalyst, and/or a phase transfer reagent. For the particularly preferred embodiment of the invention the polyethylene glycol and glycidyl ether can be reacted directly at 50° C.-160° C. in the presence of a sodium hydroxide or potassium hydroxide catalyst until the glycidyl ether is consumed. The molar ratio of poly[ethylene glycol] to hydrophobic reagent is at least 1:2 and not greater than 1:7, preferably not greater than 1:5.5; respectively.

In one embodiment the molar ratio of poly[ethylene glycol] to hydrophobic reagent is less than 1:4.5, respectively.

It is to be understood that the aforementioned synthesis methods do not in any way limit the preparation of compositions according to the invention.

The compounds of the present invention can be utilized as produced or purified by methods known to those skilled in the art. For example, for the particularly preferred embodiment of the invention comprising the reaction of poly[ethylene glycol] and glycidyl ether the resulting product can be dissolved in toluene, follow by precipitation in hexane and washing with ethyl acetate, to remove traces of residual reagents or reaction by-products.

The compositions of the present invention are used in an amount effective to inhibit the deposition of organic contaminant such as pitch and stickies.

For purposes of the present invention, the term "an effective deposition inhibiting amount" is defined as that amount which is sufficient to inhibit deposition in pulp and papermaking systems. Generally, the compositions of the present invention are used in an amount of from about 0.1 ppm, 5000 ppm, preferable from about 0.5 ppm to 3000 ppm, and more preferable at from about 1.0 ppm based on the parts of dry pulp in the system.

The compositions of the present invention can be used in the presence of electrolytes with little or no negative impact as to their effectiveness in inhibiting the deposition of organic contaminant, such as pitch and stickies from pulp and paper making systems.

The compositions of the present invention can be used in both basic and acidic environments. The pH can be as high as about 14 or as low as 1.

The compositions of the present invention can be used in a temperature range of from about 15° C., more preferable 20° C., even more preferable about 25° C. to a temperature of about 170° C. and more preferable 150° C.

The molecular weight of compositions of the present invention is from about 300 to about 100,000, preferably from about 1,000 to about 25,000 and more preferable from about 2,000 to about 10,000. The essential criterion is that the compositions of the present invention be water-soluble or water-dispersible.

The viscosity of the compositions of the present invention is from about 1 cP to about 10,000 cP, preferably from about 5 cP to about 5,000 cP and more preferable from about 10 cP to about 2,000 cP for a 5 wt % concentration in water.

The compositions of the present invention are effective at inhibiting the deposition of organic contaminants in papermaking systems. The term "papermaking systems" is meant to include all pulp processes, and all equipment for making paper from pulp. This may include but not limited to Kraft, acid sulfite, mechanical pulp and recycled fiber systems. For example, deposition in the brown stock washer, screen room and decker system in Kraft papermaking processes can be inhibited. Generally, it is thought that the compositions of the present invention can be utilized to inhibit deposition on all surfaces of the papermaking system from the pulp mill to the reel of the paper or pulp machine having a pH from at least about 1 and can range to as high as 14 under a variety of system conditions. More specifically, the compositions of the present invention can effectively decrease the deposition not only on metal surfaces but also on plastic and synthetic surfaces such as machine wires, felts, foils, Uhle boxes, rolls and head box components. It is understood that the compositions need not be applied to all surfaces, but certain places are selected.

The compositions of the present invention may be compatible with other pulp and papermaking additives or mixtures thereof. These can include, but are not limited to, starches; fillers such as titanium dioxide; defoamers; wet strength resins; cationic polymers; anionic polymers; sizing aids; and enzymes such as, but not limited to, amylases, cellulases, cutinases, endoglucanases, esterase, hemicellulases, glucosidases, β-glucose oxidases, laccases, lipases, pectinases, pectate lyases, peroxidases, proteases, pullulanases, and lipolytic enzyme capable of hydrolyzing polymers comprising the vinyl acetate monomer. Individual additives or any combinations of different additives may be applied to papermaking process together or separately with the compositions of the present invention. Individual additives may be blended together with the compositions of the present invention to produce blended compositions prior to the use in papermaking process.

The compositions of the present invention can be added to the papermaking system at any stage. They may be added directly to the pulp furnish or indirectly to the furnish through the head box. The compositions of the present invention may also be applied to surfaces that can suffer from deposition, such as the wire, press felts, press rolls and other deposition-prone surfaces. Application onto the surfaces can be by means of spraying or by any other means that coats the surfaces.

The compositions of the present invention can be added to the papermaking system neat as a powder, a dispersion in an aqueous salt solution, a solution or dispersion in conjunction with a surfactant, or a solution, the preferred primary solvent being water but is not limited to such. Examples of other carrier solvents include, but are not limited to, water-soluble solvents such as ethylene glycol and propylene glycol. Examples of surfactants used in conjunction with aqueous solutions include, but are not limited to, nonionic surfactants such as isodecyl alcohol polyglycol ether. Particularly preferred are surfactants that yield a reduced solution viscosity without adversely affecting the performance of the hydrophobically modified poly[ethylene glycol] composition of the invention. Viscosity reduction adjuncts can also be added to solutions of compositions of the present invention to simplify their handling from a commercial perspective. Such viscosity reduction adjuncts include, but are not limited to, cyclodextrins such as β-cyclodextrin.

When added by spraying techniques, the inventive composition is preferably diluted with water or other solvent to a satisfactory inhibitor concentration. The compositions of the present invention may be added specifically and only to a furnish identified as contaminated or may be added to blended pulps. The compositions of the present invention may be added to the stock at any point prior to the manifestation of the deposition problem and at more than one site when more than one deposition site occurs. Combinations of the above additive methods may also be employed by feeding the hydrophobically modified poly[ethylene glycol], by way of feeding the pulp mill stock, feeding to the paper machine furnish, and/or spraying on the wire and the felt simultaneously.

The effective amount of the compositions of the present invention to be added to the papermaking system depends on a number of variables including but not limited to the temperature of the water, additional additives, and the organic contaminant type and content of the pulp. Generally from 0.1 parts to about 150 parts of the inventive composition per million parts of dry pulp is added to the papermaking system. Preferably from about 2 parts to about 100 parts of the inventive composition are added per million parts of dry pulp in the system.

Further, the compositions of the present invention have proven effective against both the pitch and stickies manifestation of organic deposition problems providing for an effective reduction of these problems in paper mills utilizing a variety of virgin and recycled fiber sources.

There are several advantages associated with the present invention compared to prior processes. These advantages include an ability to function without being greatly affected by the hardness content of the water in the system or the pH, an ability to function at low dosages, and an ability to allow the user to use a greater amount of recycled fiber in the furnish. The composition of the invention can also be designed to have significantly reduced solution viscosities compared to prior art associative thickeners with sacrificing performance.

The present invention will now be further described with reference to a number of specific examples that are to be regarded solely as illustrative and not restricting the scope of the present invention.

EXAMPLES

Example 1

Polyethylene Glycol 8K Plus $C_{12}/C_{14}$ Alkyl Glycidyl Ether

To a suitable reaction flask equipped with a mechanical agitator, thermocouple, reflux condenser, nitrogen inlet, and addition ports was charged poly[ethylene glycol] (40 g, Mw 8,548, 0.0047 mol, Carbowax Sentry™ PEG 8000, Dow Chemical, Midland, Mich., USA) and solid sodium hydroxide (8 g, 0.2 mol). The reagents were melted together and then heated at 90° C. for 1 hour. After the hold, the $C_{12}/C_{14}$ Alkyl Glycidyl Ether (5.2 g, epoxide equivalent weight 278, 0.0187 mol, Epodil® 748, (Air Products, Allentown, Pa., USA) was charged to the reactor and the contents were mixed an additional 6 hours at 90° C. After reaction, the reactor contents were diluted in water, pH adjusted with 20 wt % aqueous HCl, and mixed until homogenous to yield a 5.0 wt % solids solution with a pH of 7.5. The Brookfield viscosity of the resulting solution was measured and found to be 740 cP.

Examples 2 to 5

Examples 2 to 5 were prepared as described in Example 1 except varying amounts of 2-ethylhexy glycidyl ether (2-EHGE, 98%, SACHEM Europe B.V., Zaltbommel, The Netherlands) was substituted for Epodil 748 in the synthesis.

Example 6

As in Example 1 except hexadecyl glycidyl ether (HAGE 16, SACHEM Europe B.V., Zaltbommel, The Netherlands) was substituted for the Epodil® 748. The PEG and 50% aqueous NaOH were mixed for 2 hours at 120° C. under a nitrogen sparge to remove trace amounts of water from the reaction vessel prior to addition of the HAGE 16. The reaction was conducted for 3 hours at 100° C. The mole ratio of PEG:NaOH:HAGE 16 used in the synthesis was 1.0:4.3:3.4, respectively.

Example 7

As in Example 6 except the mole ratio of PEG:NaOH:HAGE 16 used in the synthesis was 1.0:4.3:2.5, respectively and the reaction was held at 110° C. for 5 hours.

Example 8

As in Example 6 except dodecyl glycidyl ether (HAGE 12, Europe B.V., Zaltbommel, The Netherlands) was substituted for the HAGE 16. The mole ratio of PEG:NaOH:HAGE® 12 used in the synthesis was 1.0:2.1:4.3, respectively.

Example 9

Lauryl ketene dimer (AKD, 3.6 g, 0.0099 mol) was reacted with the poly[ethylene glycol] of Example 1 (20 g, 0.0023 mol) at 150° C. for 4 hours. After reaction material was allowed to cool to room temperature and solidify. A 6 wt % solution of the solid material in water had a Brookfield viscosity of 80 cP.

Comparative Example 1

This sample was prepared according to the teachings of U.S. Pat. Application 2005/0150418 A1 and comprised of a 7:1 mole ratio of 2-ethylhexyl glycidyl ether (EHGE, SACHEM Europe BV, Zaltbommel, The Netherlands) to poly[ethylene glycol] (9000S, Clariant, Muttenz, Switzerland), respectively. It was not possible to dissolve this material to 5 wt % in water due to its extremely high viscosity. The material was tested as an aqueous solution containing 50% by weight of actives Genapol ID 060 surfactant (Clariant, Muttenz, Switzerland),

Pitch Deposition Test (PDT)

The Pitch Deposition Test (PDT) was conducted in order to establish the efficacy of the inventive compositions as deposition control agents. In this test to a 0.5% consistency bleached hardwood Kraft pulp in DI (deionized) water at 50° C. is added 6 mL of a 25 wt % solution of calcium chloride dehydrate and 140 ml of a synthetic pitch which was preheated to 95° C. The synthetic pitch is prepared according the following procedure: 1) add 1.25 g NaOH solid to 2 L DI water, 2) heat to 95° C., 3) add a solution of 5.03 g abietic acid (75% purity, Sigma Chemical, St. Louis, Mo., USA) and 2.22 g Sylvatol 40 (Arizona Chemical, Jacksonville, Fla., USA) dissolved in ~5 g acetone, 4) add a solution of 3 g Pamak TP (Eastman Chemical, Kingston, Tenn., USA) dissolved in ~50 g acetone, 5) strip off the acetone, 6) cool to 50° C., 7) pH adjust to 8.0 with 4N HCl, and 8) adjust the mass to 2,000 g with DI water. After addition of the synthetic pitch an aliquot of the test solution is transfer to an appropriate beaker and mixing initiate via a magnetic stirrer. After equilibrating for 20 minutes, add the treatment and two test slides comprised of 3M Scotch Box Sealing Tape (Scotch 375) mounted to 35 mm film slide mounts and suspended in the solution by a fixed holder. After mixing at 50° C. for 45 minutes remove the slides from the solution, rinse with 50° C. DI water, double rinse with RT DI water, then air dry the slides at 50° C. for 1 hour. The reduction in pitch deposition is determined by taking the average of eight UV absorption measurements at 300 nm and comparing the reduction in absorbance relative to a blank. In this test the adhesive layer of the tape serves as a proxy for stickies contamination while the polypropylene backing as a substrate for pitch deposition. This results in the reading being an evaluation of the combination of stickies detackification and pitch deposition. The results of the testing are summarized in Table 1. All PDT tests were conducted at 1.92 ppm actives.

TABLE 1

| Example | Hydrophobe[1] | Moles[2] | Viscosity[3] | PDT[4] |
|---|---|---|---|---|
| 1 | Epodil ® 748 | 4.0 | 740 | 70 |
| 2 | Epodil ® 748 | 3.0 | 367 | 76 |
|   | 2-EHGE | 1.0 |  |  |
| 3 | Epodil ® 748 | 2.0 | 86 | 74 |
|   | 2-EHGE | 2.0 |  |  |
| 4 | Epodil ® 748 | 1.0 | 16 | 69 |
|   | 2-EHGE | 3.0 |  |  |
| 5 | 2-EHGE | 4.0 | 12 | 65 |
| 6 | HAGE 16 | 3.4 | 418 | 70 |
| 7 | HAGE 16 | 2.5 | 151 | 69 |
| 8 | HAGE 12 | 4.3 | 67[5] | 69 |
| 9 | AKD | 4.3 | 80[5] | 77 |
| Comparative 1 | EHGE | 7.0 | gel | <20 |
| DeTac ® DC3970[6] |  |  |  | 70 |
| Carbowax ® Sentry ® PEG 8000 |  |  |  | <5 |
| Epodil ® 748 |  |  |  | <5 |
| AKD |  |  |  | <5 |

[1]Chemical description of acronyms is provided in the examples.
[2]Moles of hydrophobic reagent relative to poly[ethylene glycol].
[3]5 wt % viscosity in water.
[4]All tests were conducted at 1.92 ppm actives.
[5]Measured at 6 wt % actives.
[6]Benchmark poly[vinyl alcohol-co-vinyl acetate] (Hercules Incorporated, Wilmington, DE, USA).

The results presented in Table 1 demonstrate that the compositions of the present invention (Examples 1-9) all provide stickies detackification and pitch deposition reduction comparable to the benchmark poly[vinyl alcohol-co-vinyl acetate] chemistry. It was also noted for Examples 1-5 that while substitution of a non-linear hydrophobe (2-EHGE) for a linear hydrophobe (Epodil® 748) did results in a decrease in hydrophobic association as evidenced by the decrease in solution viscosity it did not have a negative impact on stickies detackification and pitch deposition performance. The poor performance of Comparative Example 1 is further evidence that materials designed to maximize hydrophobic association are not necessarily effective in inhibiting the deposition of organic contaminants in pulp and papermaking systems. The poor results for the Carbowax Sentry™ PEG 8000, Epodil® 748, and AKD demonstrate that the raw materials in themselves are not effective.

Example 10

To a 5 wt % aqueous solution of a composition of the invention described in Example 1 was added 0.6 wt % actives β-cyclodextrin (Cavasol W7, Wacker Fine Chemicals, Munich, Germany) yielding a 90% reduction in the bulk viscosity of the sample. The addition of the β-cyclodextrin did not affect the PDT test results of the composition of Example 1.

Example 11

To a solution of xanthan gum (0.2 g) in water (54.7 g) was charged sodium formate (25 g). After dissolution of the salt the composition of the invention described in Example 1 (20 g) was added as a fine powder. The resulting fluidized polymer suspension had a Brookfield viscosity of ~1,000 cP. Formulating the composition of Example 1 as 20 wt % actives suspension in a salt solution did not affect the PDT test results of the composition of Example 1.

Example 12

The reaction of Example 1 was repeated except the poly [ethylene glycol] and sodium hydroxide mixture was held 1 hour at 130° C., and the reaction with the Epodil® 748 was conduct for 2 hours at 130° C. The Brookfield viscosity of a 5 wt % active solutions in water, and in water containing 1 wt % and 2.5 wt % Genapol ID 060 surfactant (Clariant), were analyzed and found to be 3,640 cP, 17,900 cP, and 1,850 cP; respectively. The PDT test results for all three samples were equivalent.

The results presented in Examples 10-12 demonstrate that the hydrophobically modified poly[ethylene glycols] of the present invention can be formulated with a viscosity modifier adjunct and/or surfactant, or as a salt solution, to yield lower viscosity products without adversely affecting the performance of the actives.

Examples 13-19

For examples 13-19 the PDT was conducted as previously described except the "synthetic pitch" was prepared according the following procedure: 4.0 g of Wesson Brand Corn Oil (ConAgra Foods, Inc., Omaha, Nebr., USA) and 1.0 g Sylvatol 40 (Arizona Chemical, Jacksonville, Fla., USA) were mixed together and then charged to 995.0 g DI water warm to approximately 50° C. and mixed with a Silverson L4RT lab mixer equipped with an emulsifier screen for two minutes. The tests were then conducted in conjunction with an enzyme designed to degrade the oil into fatty acid pitch and glycerol. The PDT test results provided in Table 2 for combinations of Example 1 and a lipase (RESINASE® A2X, NOVOZYMES A/S, Bagsvared, Denmark) demonstrate that the activity of the compositions of the present invention is not adversely affected when combined with enzymes.

TABLE 2

| Example | Example 1 (ppm)[1] | RESINASE ® A2X (ppm)[2] | PDT[3] |
|---|---|---|---|
| 13 | 1 | 0 | 18 |
| 14 | 2 | 0 | 100 |
| 15 | 0 | 2 | 28 |
| 16 | 1 | 1 | 66 |
| 17 | 1 | 2 | 4 |
| 18 | 2 | 1 | 69 |
| 19 | 2 | 2 | 95 |

[1]ppm Example 1 as actives on a dry pulp basis.
[2]ppm RESINASE ® A2X as product on a dry pulp basis.
[3]Results reported were standardized relative to the percent reduction obtained with 2 ppm of Example 1 for a given test set.

While the present invention has been described with respect to particular embodiment thereof, it is apparent that numerous other forms and modifications will be obvious to those skilled in the art. For example, the poly[ethylene glycol] could be substituted with amine or thiol end groups. Additionally, the hydrophobe could be covalently attached to the poly[ethylene glycol] by techniques such as atom transfer radical polymerization (ATRP). Other modifications include derivatization of water-soluble ethylene oxide copolymers, for example poly[ethylene glycol-co-propylene glycol]; cross-linked or branched poly[ethylene glycol]; and ethylene oxide surfactants, for example poly(ethoxylated) linear or branched, saturated or unsaturated, aliphatic or aromatic, alcohols. The appended claims and this invention generally should be construed to cover all such obvious forms and modifications, which are within the true scope of the present invention.

What is claimed is:

1. A method of inhibiting the deposition of organic contaminants in pulp or papermaking systems comprising adding to the pulp or papermaking system an effective deposition inhibiting amount of a hydrophobically modified poly[ethylene glycol] composition comprising the formula:

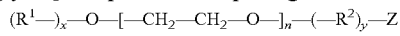

wherein $R^1$ and $R^2$ are a hydrophobic moiety, or blocks of hydrophobic moieties of x and y repeat units, covalently bonded to poly[ethylene glycol]; n is 10 to 700; x is 1 to 4; y is 0 to 4; Z is only present when y=0 and is hydrogen; the sum of x and y is greater than or equal to 2 and not greater than 5.5, and wherein said hydrophobically modified poly[ethylene glycol] composition is derived from the reaction of a polyethylene glycol and a hydrophobic reagent, the reagent selected from the group consisting of a ketene dimer, a glycidyl ether and alkenyl succinic anhydride; and wherein the viscosity of a 5 wt % concentration of the hydrophobically modified poly[ethylene glycol] composition is from about 1 cP to about 10,000 cP.

2. The method of claim 1 wherein the hydrophobically modified poly[ethylene glycol] composition is added to the pulp in an amount of at least about 0.1 ppm based on the amount of pulp in the system.

3. The method of claim 1 wherein the hydrophobically modified poly[ethylene glycol] composition is added as an aqueous solution.

4. The method of claim 1 wherein the hydrophobically modified poly[ethylene glycol] composition is added as a dispersion in an aqueous salt solution.

5. The method of claim 4 wherein the salt is sodium formate.

6. The method of claim 3 wherein the solution contains a viscosity modifier adjunct.

7. The method according to claim 6 wherein the viscosity modifier adjunct is a cyclodextrin and/or a surfactant.

8. The method of claim 1 wherein the organic contaminants are stickies deposits.

9. The method of claim 1 wherein the organic contaminants are pitch deposits.

10. The method of claim 1 wherein said hydrophobically modified poly[ethylene glycol] composition has the formula:

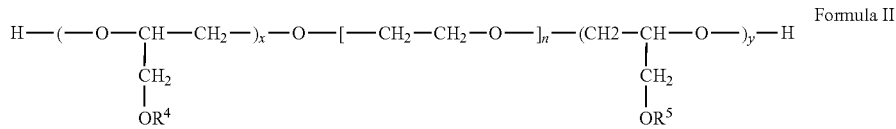

wherein n is 10 to 700; $R^4$ and $R^5$ are linear or branched, saturated or unsaturated, aliphatic or aromatic hydrocarbon radicals having from 4 to 20 carbon atoms, or mixtures thereof; x is 1 to 4; y is 0 to 4; the sum of x and y is from 2 to 5.5.

11. The method of claim 1 wherein the hydrophobically modified poly[ethylene glycol] is applied to the surfaces of papermaking machinery and equipment.

12. The method of claim 11 wherein the surfaces are selected from the group consisting of the wire, press felts, and press rolls.

13. The method of claim 11 wherein the hydrophobically modified poly[ethylene glycol] composition is in an aqueous solution.

14. The method of claim 11 wherein the hydrophobically modified poly[ethylene glycol] composition is applied in the form of a dispersion in an aqueous salt solution.

15. The method of claim 13 wherein the solution contains a viscosity modifier adjunct.

16. The method according to claim 15 wherein the viscosity modifier adjunct is a cyclodextrin and/or a surfactant.

17. The method of claim 11 wherein the organic contaminants are stickies deposits.

18. The method of claim 11 wherein the organic contaminants are pitch deposits.

19. The method of claim 11 wherein said hydrophobically modified poly[ethylene glycol] composition is derived by the reaction of polyethylene glycol with a glycidyl ether to yield a compound with the following formula:

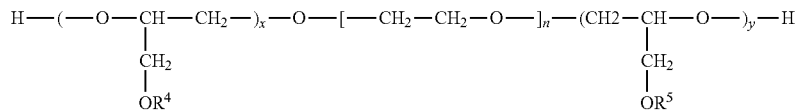

wherein n is 10 to 700; $R^4$ and $R^5$ are linear or branched, saturated or unsaturated, aliphatic or aromatic hydrocarbon radicals having from 4 to 20 carbon atoms, or mixtures thereof; x is 1 to 4; y is 0 to 4; the sum of x and y is from 2 to 5.5.

20. A method of inhibiting the deposition of organic contaminants in pulp or papermaking systems comprising adding to the pulp or papermaking system an effective deposition inhibiting amount of a hydrophobically modified poly[ethylene glycol] composition comprising the formula:

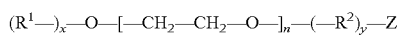

wherein $R^1$ and $R^2$ are a hydrophobic moiety, or blocks of hydrophobic moieties of x and y repeat units, covalently bonded to poly[ethylene glycol]; 10 to 700; 1 to 4; y is 0 to 4; Z is only present when y=0 and is hydrogen; the sum of x and y is greater than or equal to 2 and not greater than 5.5, and wherein said hydrophobically modified poly[ethylene glycol] composition is derived from the reaction of a polyethylene glycol and a glycidyl ether; and wherein the viscosity of a 5 wt % concentration of the hydrophobically modified poly[ethylene glycol] composition is from about 1 cP to about 10,000 cP.

* * * * *